US008598997B2

(12) United States Patent
Hayashi et al.

(10) Patent No.: US 8,598,997 B2
(45) Date of Patent: *Dec. 3, 2013

(54) VEHICULAR ANNUNCIATION DEVICE AND METHOD FOR NOTIFYING PROXIMITY OF A VEHICLE HAVING AN ULTRASONIC SPEAKER

(75) Inventors: Toshio Hayashi, Obu (JP); Toshiaki Nakayama, Miyoshi (JP)

(73) Assignee: Denso Corporation, Kariya (JP)

( * ) Notice: Subject to any disclaimer, the term of this patent is extended or adjusted under 35 U.S.C. 154(b) by 208 days.

This patent is subject to a terminal disclaimer.

(21) Appl. No.: 13/241,354

(22) Filed: Sep. 23, 2011

(65) Prior Publication Data

US 2012/0092185 A1  Apr. 19, 2012

(30) Foreign Application Priority Data

Oct. 19, 2010 (JP) .................................. 2010-234501

(51) Int. Cl.
*G08B 21/00* (2006.01)
(52) U.S. Cl.
USPC ................ 340/384.1; 340/384.3; 340/384.73; 116/137 R
(58) Field of Classification Search
USPC ........... 340/384.1, 384.3, 384.73, 388.1, 474; 116/137 R
See application file for complete search history.

(56) References Cited

U.S. PATENT DOCUMENTS 8,217,767 B2 * 7/2012 Nakayama ................. 340/384.1

FOREIGN PATENT DOCUMENTS

| JP | A-58-162994 | 9/1983 |
| JP | U-62-020938 | 2/1987 |
| JP | 2-73296 | 3/1990 |
| JP | 2005-289175 | 10/2005 |
| JP | P2008-273251 A | 11/2008 |

OTHER PUBLICATIONS

Japanese Office Action dated Jul. 24, 2012, issued on corresponding Japanese Application No. 2010-234501 with English translation.

* cited by examiner

*Primary Examiner* — Jeffery Hofsass
(74) *Attorney, Agent, or Firm* — Nixon & Vanderhye PC

(57) ABSTRACT

An electromagnetic alarm device includes a current interrupter to interrupt an electricity supply to a coil on application of a self-excited voltage to oscillate a diaphragm with a moving core to generate a first alarm sound including a fundamental tone at a first predetermined frequency, when a switch is manipulated by an occupant. A proximity notification device includes an ultrasonic speaker to emit an ultrasonic wave, which is generated by implementing ultrasonic modulation on a proximity notification sound, to an outside of the vehicle for notifying a pedestrian of proximity of the vehicle, according to a traveling state of the vehicle and/or when a sensor detects a pedestrian. The ultrasonic speaker emits an ultrasonic wave, which is generated by implementing ultrasonic modulation on a second alarm sound including a fundamental tone at a second frequency, when the switch is manipulated.

13 Claims, 7 Drawing Sheets

VEHICULAR ANNUNCIATION DEVICE AND METHOD FOR NOTIFYING PROXIMITY OF A VEHICLE HAVING AN ULTRASONIC SPEAKER

CROSS REFERENCE TO RELATED APPLICATIONS

This application is based on and claims priority to Japanese Patent Application No. 2010-234501 filed on Oct. 19, 2010, the contents of which are incorporated in their entirely herein by reference.

FIELD OF THE INVENTION

The present invention relates to an annunciation device for a vehicle to, for example, notify proximity of the vehicle. The present invention further relates to a method for notifying proximity of a vehicle.

BACKGROUND OF THE INVENTION

In recent years, vehicles, such as electric vehicles, fuel cell vehicles, and hybrid vehicles, configured to emit a small vehicle running sound are increasingly in practice. It is noted that, such vehicles with a small vehicle running sound are hardly recognized by a pedestrian. In consideration of this, for example, JP-A-2005-289175 discloses a vehicle proximity notification device equipped in a vehicle and configured to cause a dynamic speaker to directly radiate an audible sound as a proximity notification sound to the outside of the vehicle so as to notify existence of the vehicle to pedestrians around the vehicle. It is noted that, in order to generate a comfortable low-frequency sound using a dynamic speaker, it is required to equip a vehicle with a woofer device or the like having a large diaphragm. Mountability of such a large device becomes low, and the weight of such a large device is increased.

In such a vehicle equipped with a vehicle proximity notification device, similarly to other vehicles, two electromagnetic whistle devices (electromagnetic alarm devices) are further provided to emit a whistle sound (alarm sound) to the outside of the vehicle when a horn buzzer switch device is manipulated by an occupant. Specifically, the two electromagnetic whistle devices equipped in a vehicle configure a double-horn-type structure for emitting simultaneously whistle sound components in two different tones including first whistle sound (first alarm sound) and second whistle sound (second alarm sound) in order to generate a massive tone and to improve comfortableness of the whistle sound. In order to generate simultaneously the whistle sound in two different tones, it is necessary to equip a vehicle with both the first electromagnetic whistle device for causing the first whistle sound and the second electromagnetic whistle device for causing the second whistle sound, which is in a different tone from that of the first whistle sound.

The two electromagnetic whistle devices are configured to generate whistle sound components when receiving a direct current signal at a self-excited voltage greater than or equal to a threshold such as 8 volt. Specifically, such an electromagnetic whistle device includes:
- a coil configured to cause a magnetism on receiving electricity supply;
- a current interrupter configured to intermit an electricity supply circuit of the coil when a direct current at a self-excited voltage greater than a threshold is applied to the coil;
- a moving iron core configured to be driven by the magnetism of the coil; and
- a vibrating plate (diaphragm) joined with the moving iron core.

For example, JP-A-58-162994 discloses an electromagnetic whistle device including a coil configured to cause oscillation of a diaphragm together with a moving iron core when a self-excited voltage is applied to the coil to cause a current interrupter to intermit electricity supply to the coil thereby to cause a whistle sound.

According to the prior arts as described above, it is required to provide two electromagnetic whistle devices in a vehicle in order to generate simultaneously a whistle sound in two different tones.

SUMMARY OF THE INVENTION

In view of the foregoing and other problems, it is an object of the present invention to produce a vehicular annunciation device excellent in mountability to a vehicle and configured to generate a whistle sound simultaneously in two different tones with one electromagnetic whistle device reduced in number. It is another object of the present invention to produce a method for notifying proximity of a vehicle.

For example, it is conceived to produce a vehicle proximity notification device including a parametric speaker configured to emit a proximity notification sound to the outside of a vehicle, instead of using a dynamic speaker, to notify a pedestrian around the vehicle of proximity of the vehicle. It is noted that the present concept about the parametric speaker is not a conventional art. Such a vehicle proximity notification device configured to emit a proximity notification sound to the outside of the vehicle by using a parametric speaker is, for example, configured to implement an ultrasonic modulation on a waveform signal of a proximity notification sound to produce an ultrasonic wave being an inaudible sound for a human. An amplitude component of the ultrasonic wave emitted from the ultrasonic speaker is self-demodulated in the course of propagation through the air. Thereby, the proximity notification sound is reproduced at a place distant from the vehicle. Such a parametric speaker includes an ultrasonic speaker, which is smaller than a dynamic speaker and configured to generate a low-pitched sound. Thus, problems of a dynamic speaker such as the device size can be solved by employing such a parametric speaker in this way.

In consideration of these subjects, according to one aspect of the present invention, a vehicular annunciation device comprises an electromagnetic alarm device being a single element. The electromagnetic alarm device includes a coil configured to generate a magnetism when supplied with an electricity. The electromagnetic alarm device further includes a current interrupter configured to interrupt an electricity supply circuit of the coil when the coil receives a direct current at a self-excited voltage greater than or equal to a threshold. The electromagnetic alarm device further includes a moving iron core configured to be driven by the magnetism generated by the coil. The electromagnetic alarm device further includes a diaphragm joined with the moving iron core, wherein the current interrupter is configured to intermit the electricity supplied to the coil to oscillate the diaphragm with the moving iron core to generate a first alarm sound including a fundamental tone at a first predetermined frequency, when an alarm switch device is manipulated by an occupant to apply the self-excited voltage on the coil. The vehicular annunciation device further comprises a vehicle proximity notification device including a parametric speaker configured to cause an ultrasonic speaker to emit a notification ultrasonic wave to an outside of the vehicle for notifying a pedestrian of proximity of the vehicle, according to a traveling state of the vehicle and/or when a sensor detects a pedestrian, the notification ultrasonic wave being generated by implementing ultrasonic modulation on a proximity notification sound, which is different from an alarm sound. The vehicle proximity notification device is configured to cause the ultrasonic speaker to emit an alarm ultrasonic wave when the alarm switch device is manipulated, the alarm ultrasonic wave being generated by implementing ultrasonic modulation on a second alarm sound including a fundamental tone at a second frequency, which is different from the first frequency.

According to another aspect of the present invention, a method for notifying proximity of a vehicle, the method comprises implementing ultrasonic modulation on a proximity notification sound, which is different from an alarm sound, to generate a notification ultrasonic wave and causing an ultrasonic speaker to emit the notification ultrasonic wave to an outside of the vehicle for notifying a pedestrian of proximity of the vehicle, according to a traveling state of the vehicle and/or on detection of a pedestrian. The method further comprises causing a current interrupter to intermittently send a direct current at a self-excited voltage, which is greater than or equal to a threshold, to a coil to manipulate a magnetism generated by the coil for driving a moving iron core thereby to oscillate a diaphragm to generate a first alarm sound including a first fundamental tone at a first predetermined frequency, when an alarm switch device is manipulated by an occupant. The method further comprises implementing ultrasonic modulation on a second alarm sound including a second fundamental tone at a second frequency, which is different from the first frequency, to generate an alarm ultrasonic wave and causing the ultrasonic speaker to emit the alarm ultrasonic wave, when the alarm switch device is manipulated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
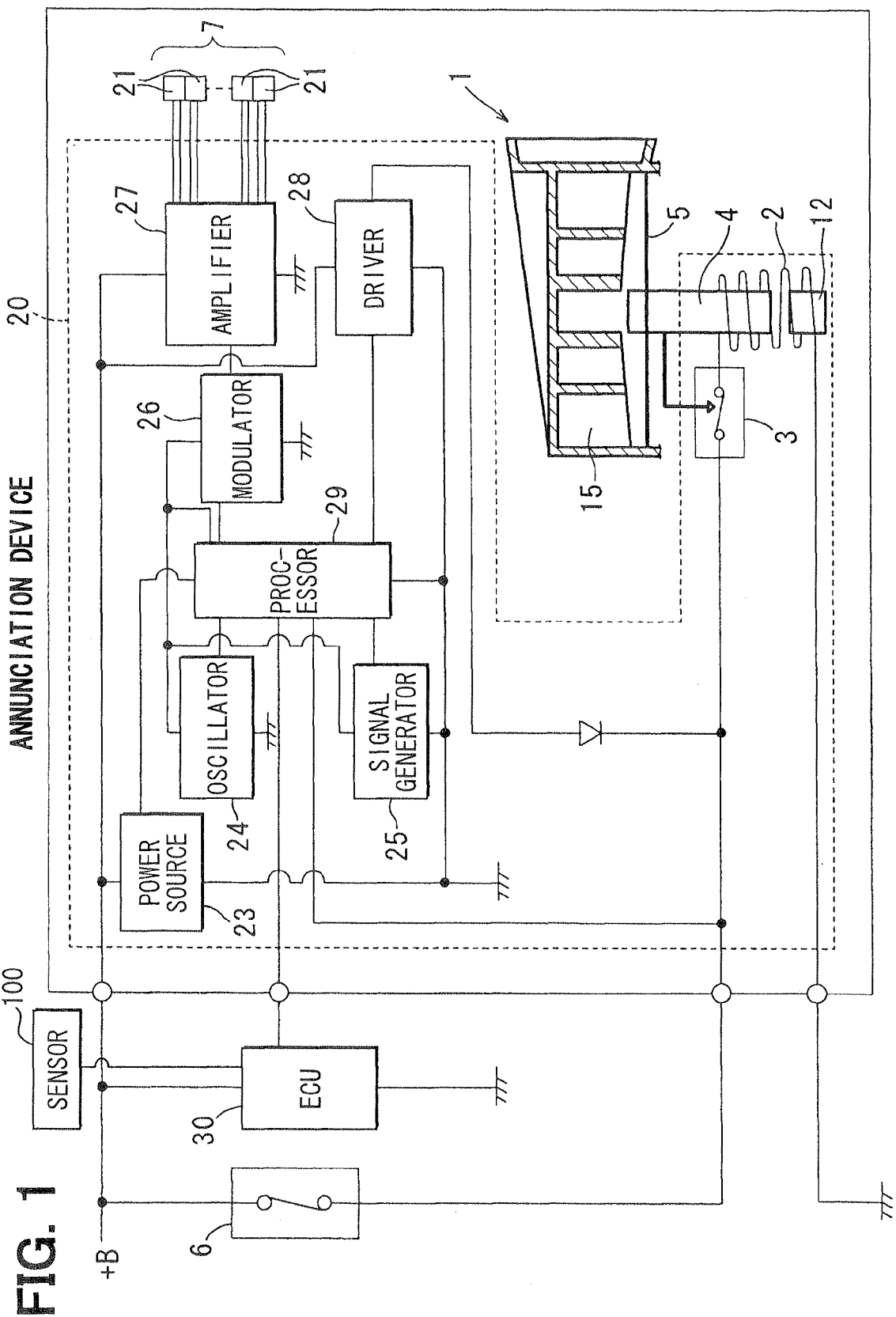
FIG. 1 is a schematic view showing a vehicular annunciation device.

As follows, an example of a vehicular annunciation device will be described with reference to drawings. The vehicular annunciation device includes a single electromagnetic whistle device (electromagnetic alarm device) 1 configured to cause the first whistle sound (first alarm sound) when being applied with a direct current signal at a self-excited voltage, such as a voltage more than 8 volt, greater than a threshold. The electromagnetic whistle device 1 includes a coil 2, a current interrupter 3, a moving iron core 4, and a diaphragm 5. The coil 2 causes magnetism on receiving electricity supply. The current interrupter 3 activates and deactivates an electricity supply circuit of the coil 2 when the coil 2 receives a direct current signal at the self-excited voltage more than the threshold. The moving iron core 4 is driven by a magnetism of the coil 2. The diaphragm 5 is joined with the moving iron core 4. When a horn buzzer switch device (alarm switch device) 6 is manipulated by an occupant, the self-excited voltage is applied to the coil 2. Thereby, the current interrupter 3 interrupts electricity supply to the coil 2 to cause vibration of the diaphragm 5 together with the moving iron core 4. Thus, the electromagnetic whistle device 1 causes the first whistle sound (first alarm sound) including a fundamental tone at the first predetermined frequency.

The vehicular annunciation device further includes a vehicle proximity notification device. The vehicle proximity notification device generates a proximity notification sound, such as a dummy engine sound, using a parametric speaker. The vehicle proximity notification device causes a ultrasonic speaker 7 to emit a ultrasonic wave generated by implementing ultrasonic modulation on the proximity notification sound to the outside of the car according to a traveling state of the vehicle and/or on detection of a pedestrian by a sensor 100. In this way, the vehicle proximity notification device notifies the pedestrian of proximity of the vehicle. The traveling state may be detected by using the ECU 30 according to, for example, input signals from various sensors.

The vehicle proximity notification device causes the ultrasonic speaker 7 to emit a ultrasonic wave generated by implementing ultrasonic modulation on the second whistle sound (second alarm sound) on manipulation of the horn buzzer switch device 6. The ultrasonic wave includes a fundamental tone at the second frequency, which is different from the first frequency. In this way, the one electromagnetic whistle device 1 (vehicular horn device) is caused to emit the first whistle sound, and the ultrasonic speaker 7 (parametric speaker) of the vehicle proximity notification device is caused to emit the second whistle sound.

Thus, even though the number of the electromagnetic whistle device is one in the present configuration, the electromagnetic whistle device is capable of generating a tone of a double horn device. It is noted that an electric signal for the proximity notification sound at a separately-excited voltage, which is lower than the self-excited voltage, may be applied to the electromagnetic whistle device 1, when the vehicle proximity notification device causes the parametric speaker to emit the proximity notification sound. In this case, the electromagnetic whistle device 1, which functions as a dynamic speaker, is also caused to emit a proximity notification sound in this way.

(Embodiment)

As follows, one detailed example will be described with reference to drawings. The following embodiment is one example, and the present invention is not limited to the embodiment. In the following embodiment, the same notation as that in the embodiment denotes substantially the same functional object.

(Description of Electromagnetic Whistle Device 1)

A vehicle S according to the present embodiment is equipped with one electromagnetic whistle device 1 (vehicular horn buzzer) configured to cause a whistle sound when the horn buzzer switch device 6 is manipulated by an occupant. The electromagnetic whistle device 1 causes a first whistle sound when being applied with a direct current signal at a self-excited voltage, which is greater than the threshold. The self-excited voltage is, for example, greater than or equal to 8 volt, such as a battery voltage. For example, the electromagnetic whistle device 1 is mounted on a front part of the vehicle S.

As follows, a detailed example of the electromagnetic whistle device 1 will be described with reference to FIGS. 1, 2. The electromagnetic whistle device 1 is mounted on the vehicle S via a stay 11. The electromagnetic whistle device 1 includes:

- a coil 2 configured to generate a magnetism on receiving electricity supply;
- a stationary iron core 12 (magnetic attraction core) configured to cause a magnetic attractive force on generation of the magnetism by the coil 2;
- a moving iron core 4 (moving core) supported by a center portion of a diaphragm 5 and movable toward the stationary iron core 12; and
- a traveling contact 14 configured to move in conjunction with movement of the moving iron core 4, the traveling contact 14 configured to move away from a stationary contact 13 to terminate the electricity supply to the coil 2 on movement of the moving iron core 4 toward the stationary iron core 12.

When the direct current signal at the self-excited voltage, which is greater than or equal to the threshold such as 8 volt, is sent to electricity supply terminals connected to both ends of the coil 2 in the electromagnetic whistle device 1, the electromagnetic whistle device 1 continually repeats:

(i) an attraction operation to cause the stationary iron core 12 to magnetically attract the moving iron core 4 by electricity supply to the coil 2 to move the traveling contact 14 away from the stationary contact 13 thereby to terminate the electricity supply to the coil 2; and (ii) a restoration operation to cause the diaphragm 5 to apply resilience of a return spring to the moving iron core 4 on termination of the electricity supply thereby to return the moving iron core 4 at an initial position to cause the stationary contact 13 to make contact with the traveling contact 14 thereby to resume the electricity supply to the coil 2.

In the present structure, the stationary contact 13 and the traveling contact 14 form the current interrupter 3 configured to intermittent the electricity supply circuit of the coil 2 when the direct current signal at the self-excited voltage greater than the threshold is applied to the coil 2. In this way, the electromagnetic whistle device 1 causes intermittence of the electricity supply to the coil 2 thereby to cause the stationary iron core 12 to intermittent generation of the magnetic attractive force. Thus, the electromagnetic whistle device 1 causes the diaphragm 5 to oscillate together with the moving iron core 4 thereby to emit the whistle sound.

Figure 3:
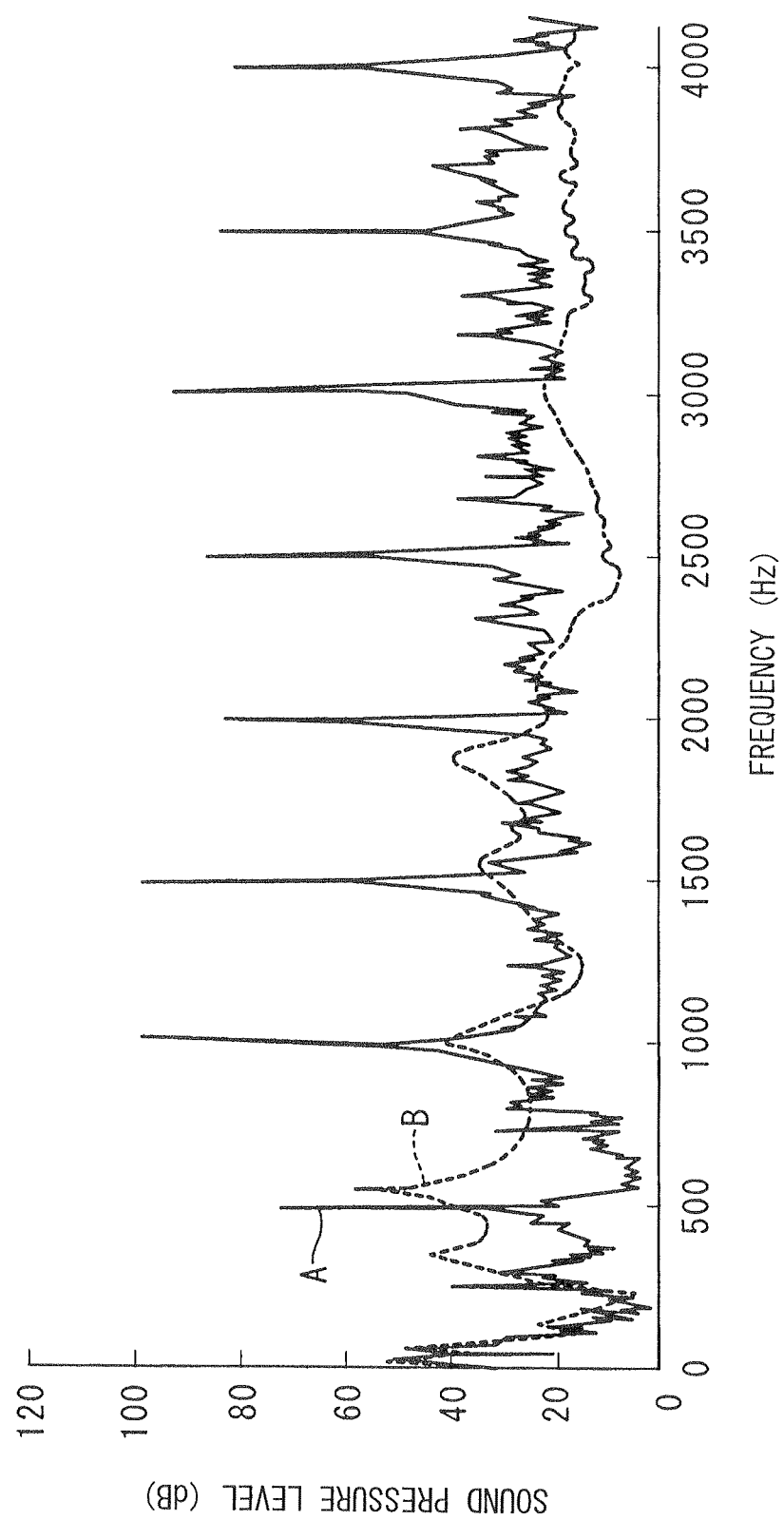
FIG. 3 is a graph showing a frequency characteristic when a self-excited voltage is applied to the electromagnetic whistle device and a frequency characteristic when a separately-excited voltage is applied to the electromagnetic whistle device.
Figure 4:
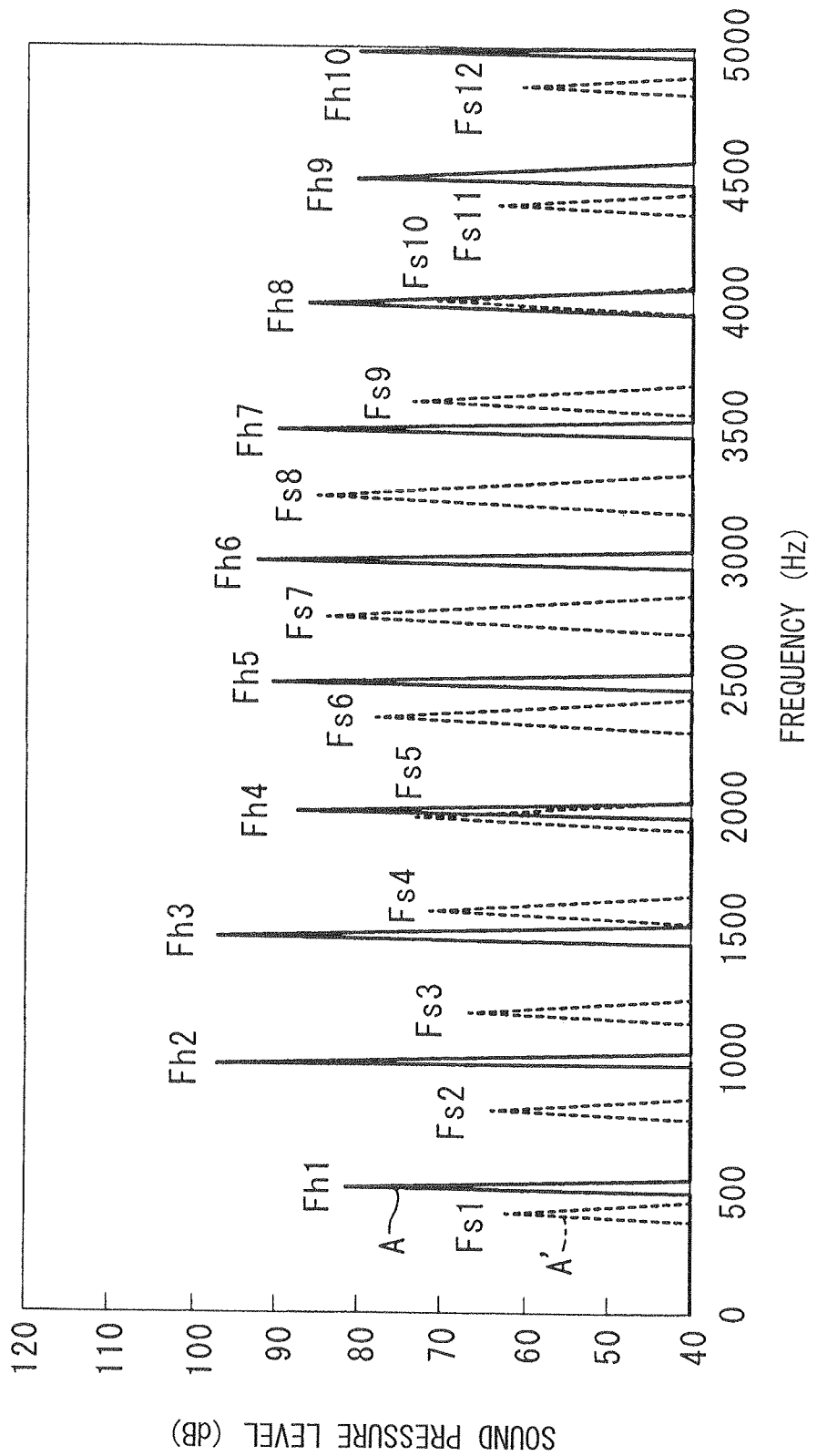
FIG. 4 is a graph showing a frequency characteristics of the first whistle sound and the second whistle sound.

The electromagnetic whistle device 1 causes the first whistle sound including the fundamental tone at the first predetermined frequency. The first frequency of the fundamental tone of the first whistle sound according to the embodiment is, for example, at 500 Hz. FIGS. 3, 4 are diagrams showing frequency characteristics. In FIGS. 3, 4, the whistle sound shown by the solid lines A is an operation sound caused by the electromagnetic whistle device 1 when the self-excited voltage is applied.

As explicitly shown by the solid line A in FIGS. 3, 4, the first whistle sound emitted by the electromagnetic whistle device 1 when being applied with the self-excited voltage includes the first frequency Fh1 and harmonic frequencies Fh2 to Fh10 of the first frequency. As denoted by Fh1 in FIG. 4, the first frequency is, for example, 500 Hz being set by the interval of ON-OFF of the traveling contact 14. The harmonic frequencies are denoted by Fh2 to Fh10 in FIG. 4.

A frequency signal at the separately-excited voltage less than the self-excited voltage, such as 8 volt, may be applied to the electromagnetic whistle device 1. In this case, the electromagnetic whistle device 1 can be used as a dynamic speaker. The dashed line B in FIG. 3 shows a frequency characteristic of the electromagnetic whistle device 1 in the case where the electromagnetic whistle device 1 is used as a dynamic speaker. The dashed line B shows a frequency characteristic when a sweep signal, which is a sign wave at 1 volt, is applied to the electromagnetic whistle device 1. The sweep signal is a variable signal changing between a low frequency and a high frequency.

Figure 2A:
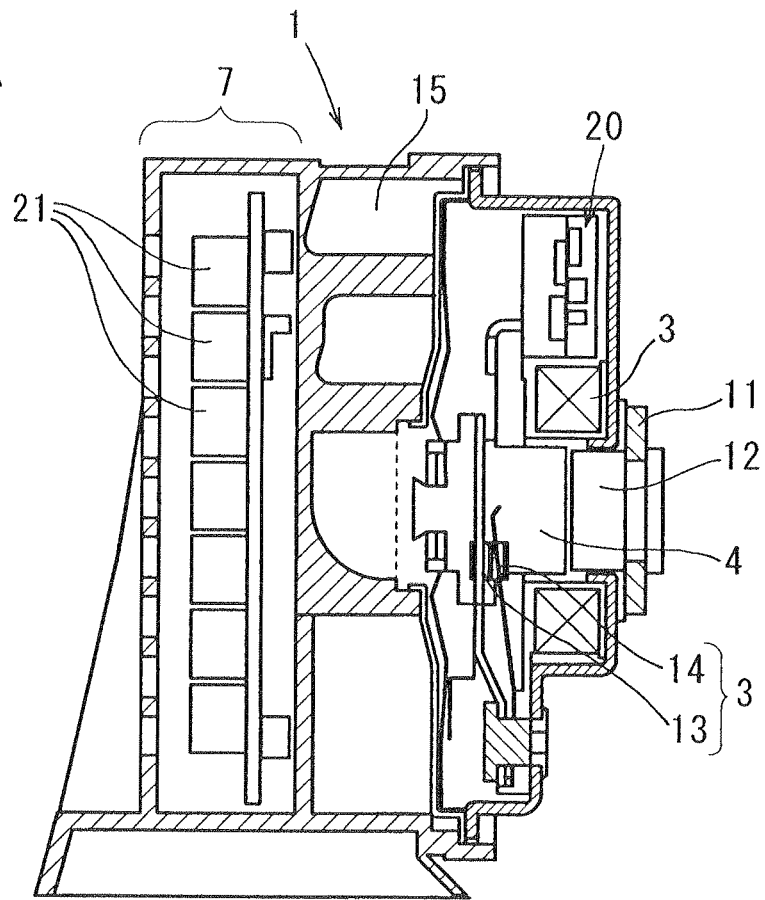
FIG. 2A is a sectional view showing an ultrasonic speaker equipped in the electromagnetic whistle device.

As shown in FIGS. 1, 2A, the electromagnetic whistle device 1 according to the present embodiment includes an acoustic tube 15 (spiral trumpet member, swirl horn buzzer) being in the shape of a spiral tube. The electromagnetic whistle device 1 is configured to enhance a whistle sound caused by oscillation of the diaphragm 5 and to emit the enhanced whistle sound to the outside of the vehicle.

(Description of Vehicle Proximity Notification Device)

The vehicle S according to the present embodiment is, for example, an automobile such as an electric vehicle causing a quiet running sound. The vehicle S includes the vehicle proximity notification device configured to cause the parametric speaker to emit a proximity notification sound, such as a dummy engine sound, to the outside of the vehicle according to a traveling state of the vehicle S and/or when a sensor detects a pedestrian. The parametric speaker is related to an art to implement ultrasonic modulation on a waveform signal of an audible sound (sound wave, which can be heard by an ear) and to cause the ultrasonic speaker 7 to radiate the modulated waveform being an ultrasonic wave. Further, an amplitude component included in the ultrasonic wave (sound wave, which cannot be heard by an ear) radiated from the ultrasonic speaker 7 is self-demodulated in the course of transmission through the air. Thereby, an audible sound is reproduced at a distant place from the vehicle S. In the present embodiment, the audible sound is the proximity notification sound and the second whistle sound.

More specifically, the vehicle proximity notification device includes the ultrasonic speaker 7 and a control circuit part 20. The ultrasonic speaker 7 is configured radiate an ultrasonic wave. The control circuit part 20 is configured implement an operation control of the ultrasonic speaker 7.

As shown in FIG. 1, the control circuit part 20 further includes a circuit (mentioned later) for causing the electromagnetic whistle device 1 to operate as a dynamic speaker. As shown in FIG. 2A, the control circuit part 20 may be located inside the electromagnetic whistle device 1.

(Description of Ultrasonic Speaker 7)

Figure 2B:
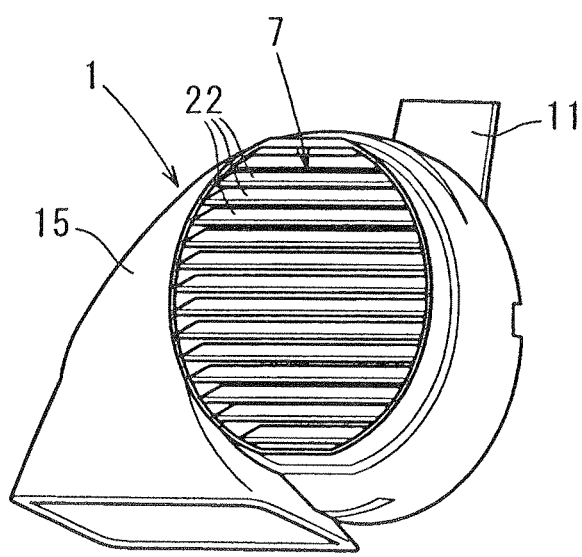
FIG. 2B is a perspective view showing the ultrasonic speaker.

The ultrasonic speaker 7 is mounted on, for example, a front part of the vehicle S and/or the like to emit an ultrasonic wave ahead the vehicle S. In the present embodiment, as shown in FIG. 2B, the ultrasonic speaker 7 is mounted on a lateral side of the acoustic tube 15 directed ahead of the vehicle S.

The ultrasonic speaker 7 is an ultrasonic wave generator configured to generate aerial oscillation at a frequency higher than human's audible range, i.e., at a frequency higher than, for example, 20 kHz. The ultrasonic speaker 7 according to the present embodiment includes multiple piezoelectric speakers 21, such as a ceramic speaker, a piezoelectric speaker, and/or the like) arranged to construct a speaker array for ultrasonic reproduction. The piezoelectric speaker 21 according to the present embodiment may have a generally known structure including a piezo-electric element and a diaphragm 5. The piezo-electric element is configured to expand and contract according to an applied voltage being charged and discharged. The diaphragm 5 is configured to cause oscillation in air in response to the extension and contraction of the piezo-electric element.

The ultrasonic speaker 7 is configured to control an amount of energy of an ultrasonic wave and a directional range of an ultrasonic wave emitted from the piezoelectric speakers 21 according to the number and the arrangement of the piezoelectric speakers 21. The ultrasonic speaker 7 has an ultrasonic irradiation port equipped with a unit for protection from rainwater and for irradiation of an ultrasonic wave. According to the present embodiment, as shown in FIG. 2B, a louver 22 (louver door) is provided for suppressing permeation of rainwater. The louver 22 is arranged not to spoil a straightness of an ultrasonic wave irradiated from the piezoelectric speaker 21. More specifically, the louver 22 is arranged such that an ultrasonic wave irradiated from the ultrasonic speaker 7 toward the front side of the vehicle S is once redirected downward along the inner surface of the louver 22 and is further redirected to the front side of the vehicle S along the outer surface of the louver 22 at the lower side. Thus, the ultrasonic wave is radiated along the traveling direction of the vehicle S consequently. It is noted that, instead of the louver 22, another device such as a punching metal having a punched hole and/or a mesh plate may be used.

Figure 5:
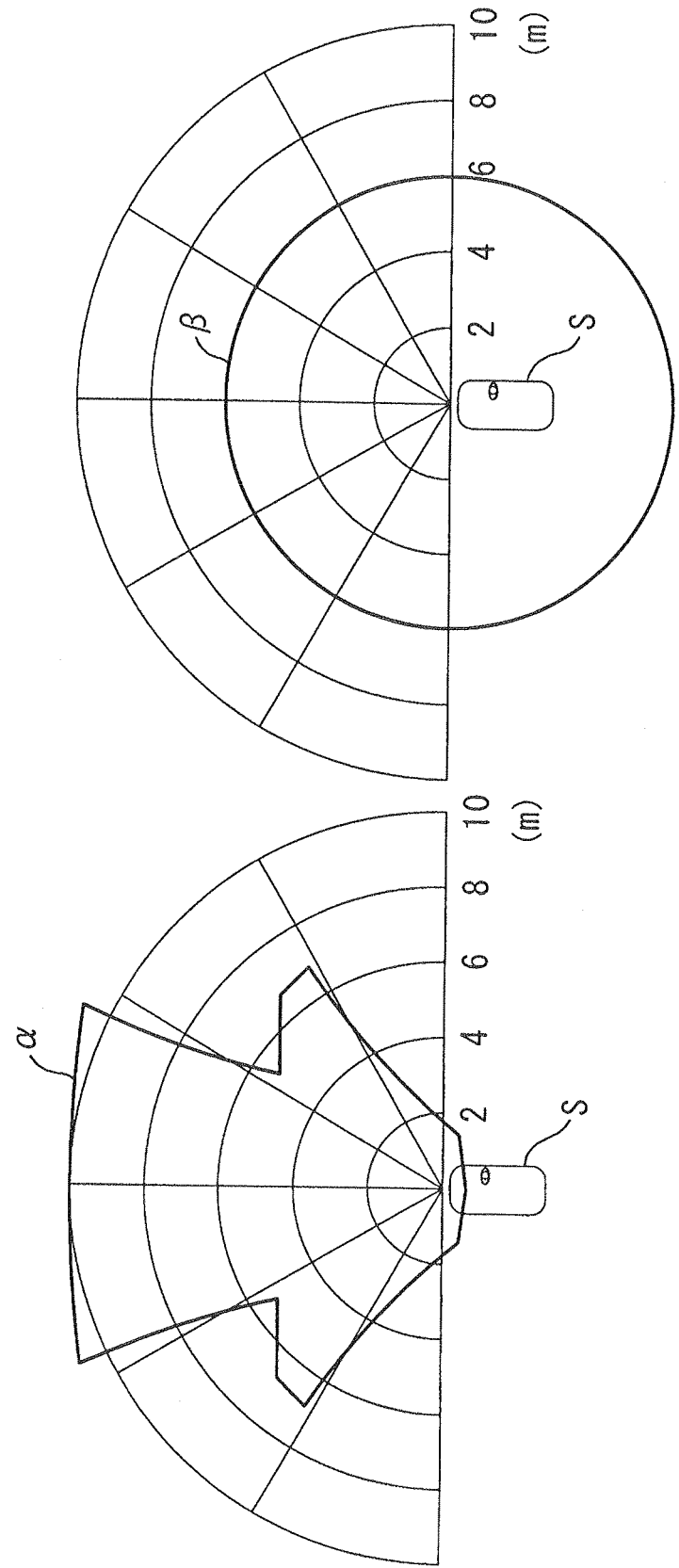
FIGS. 5A, 5B are explanatory views each showing an access range of a proximity notification sound.

FIG. 5A shows an access range a of the proximity notification sound caused by the parametric speaker, and FIG. 5B shows an access range f3 of the proximity notification sound caused by the electromagnetic whistle device 1. FIGS. 5A, 5B show an example of the access ranges of the proximity notification sound at a sound pressure of 50 dB. In this way, the ultrasonic speaker 7 according to the present embodiment is arranged to radiate an ultrasonic wave ahead of the vehicle S. The electromagnetic whistle device 1 is arranged such that the proximity notification sound reaches the circumference of the electromagnetic whistle device 1 substantially uniformly when the vehicle S is viewed from the top side. For example, an opening of the acoustic tube 15 of the electromagnetic whistle device 1 may be directed downward of the vehicle S toward the road surface. The direction of the opening of the acoustic tube 15 is not limited downward.

(Description of Control Circuit Part 20)

The control circuit part 20 includes:

(a) a power supply circuit 23 configured to generate a required voltage at a battery voltage line +B in the control circuit part 20;

(b) an ultrasonic oscillating circuit 24 configured to generate a supersonic oscillation at a frequency such as 25 kHz;

(c) an annunciation signal generation circuit 25 configured to generate a frequency signal for the proximity notification sound and a frequency signal for the second whistle sound;

(d) an ultrasonic amplitude modulation circuit 26 configured to modulate the frequency signal for the proximity notification sound and/or the second whistle sound to be at an ultrasonic frequency;

(e) an ultrasonic wave amplification circuit 27 configured to drive the ultrasonic speaker 7 at the modulated ultrasonic frequency;

(f) a horn buzzer drive circuit 28 configured to drive the electromagnetic whistle device 1 according to the frequency signal of the proximity notification sound and/or the second whistle sound; and (g) a signal processing circuit 29 configured to control operations of those components.

(Description of Annunciation Signal Generation Circuit 25)

The annunciation signal generation circuit 25 is configured to generate the frequency signal for the proximity notification sound stored beforehand and/or the frequency signal for the second whistle sound stored beforehand, in response to an instruction of the signal processing circuit 29. The proximity notification sound is not limited to a specific sound and may be a sound for notifying a pedestrian of proximity of the vehicle S. The proximity notification sound may be a sound, such as a chord sound, which hardly causes discomfort around the vehicle S. Specifically, the vehicle notification sound may be arbitrary selected from, for example, a dummy engine sound, a sound at a predetermined frequency, a synthetic sound including sounds at multiple frequencies, an audio signal, and/or the like.

The second whistle sound is the whistle sound including the fundamental tone at the second frequency different from the first frequency at which the fundamental tone of the first whistle sound is. As shown by the dashed line A' in FIG. 4, the second whistle sound includes harmonic components including a fundamental tone at the second frequency Fs1 of 400 Hz. More specifically, the second whistle sound includes the harmonic components including a fundamental tone at the second frequency Fs1 of 400 Hz and multiple harmonic frequencies Fs2 to Fs 12 in FIG. 4.

Specifically, the second whistle sound according to the present embodiment is caused simultaneously with the first whistle sound to form a chord sound. In the present configuration, the first frequency and the second frequency are in a relation to form a chord sound. More specifically, as respectively shown by the solid line A and the dashed line A' in FIG. 4, the first frequency is set at, for example, 500 Hz, and the second frequency is set at, for example, 400 Hz. According to the present embodiment, the second frequency, at which the fundamental tone of the second whistle sound caused by the ultrasonic speaker 7, is set to be lower than the first frequency, at which the fundamental tone of the first whistle sound caused by the electromagnetic whistle device 1 in this way.

(Description of Ultrasonic Amplitude Modulation Circuit 26)

The ultrasonic amplitude modulation circuit 26 is configured to modulate:

(i) increase and decrease in voltage of the frequency signal for the proximity notification sound outputted from the annunciation signal generation circuit 25; and/or (ii) increase and decrease in voltage of the frequency signal for the second whistle sound outputted from the annunciation signal generation circuit 25, into an amplitude change in oscillation voltage of the ultrasonic frequency such as 25 kHz.

The ultrasonic modulation implemented by the ultrasonic amplitude modulation circuit 26 will be described with reference to FIG. 6. The ultrasonic modulation is to modulate the frequency signal for the proximity notification sound and/or the second whistle sound into the amplitude change in the oscillation voltage. For example, it is supposed that the frequency signal for the proximity notification sound and/or the second whistle sound inputted to the ultrasonic amplitude modulation circuit 26 is the voltage change shown by (a) in FIG. 6. In the drawing, a waveform at a single frequency is shown for easy understanding. It is supposed that the ultrasonic oscillating circuit 24 causes oscillation at the ultrasonic frequency shown by (b) in FIG. 6.

Figure 6:
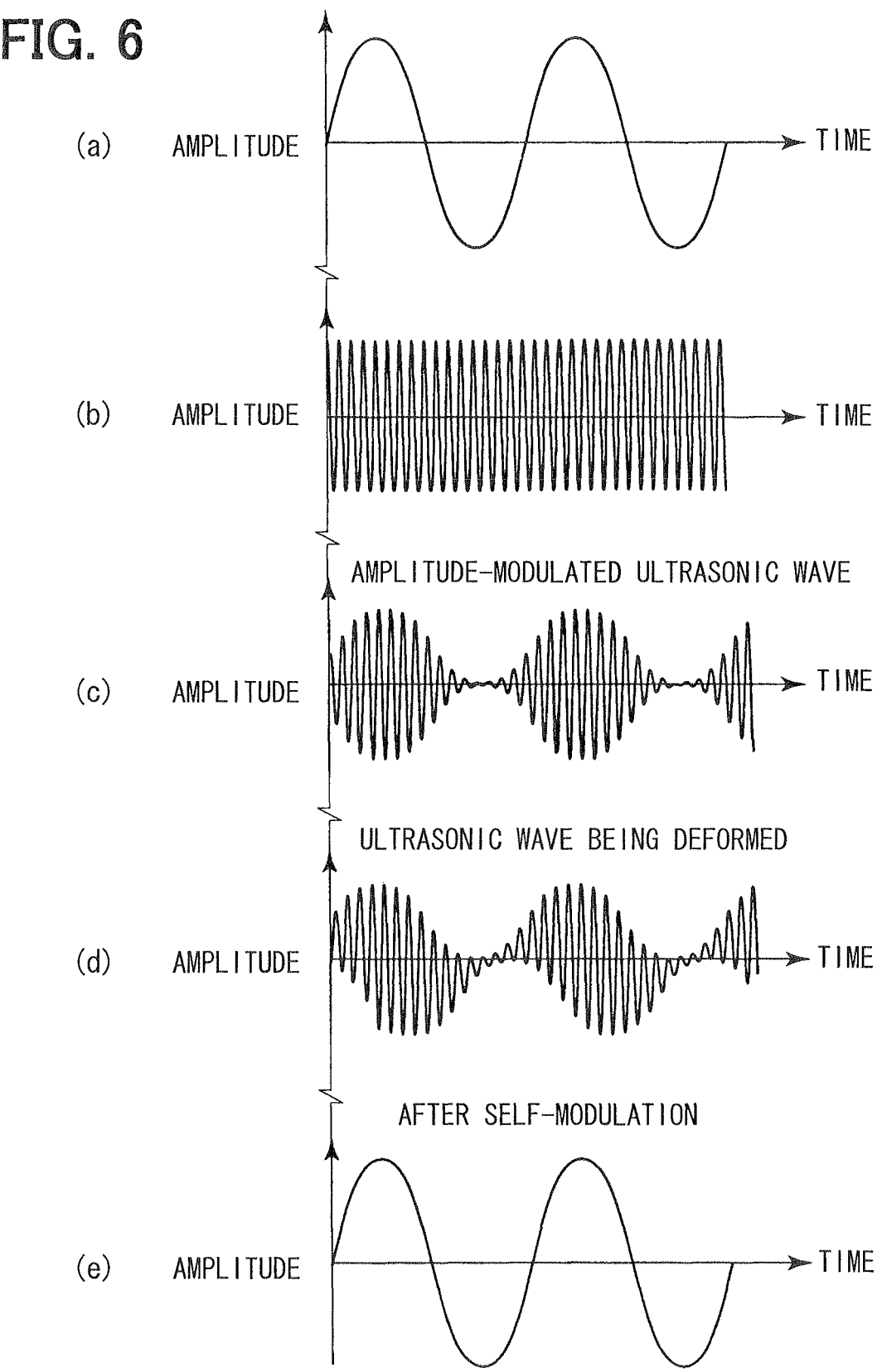
FIG. 6 is an explanatory view showing principle of operation of a parametric speaker.

As shown by (c) in FIG. 6, the ultrasonic amplitude modulation circuit 26:

(i) increase the amplitude of the voltage according to the supersonic oscillation, as the signal voltage of the frequency for the proximity notification sound and/or the second whistle sound increases; and (ii) decrease the amplitude of the voltage according to the supersonic oscillation, as the signal voltage of the frequency for the proximity notification sound and/or the second whistle sound decreases.

In this way, the ultrasonic amplitude modulation circuit 26 is configured to modulate the frequency signal for the proximity notification sound and/or the second whistle sound inputted from the annunciation signal generation circuit 25 into the amplitude change in oscillation voltage of the ultrasonic frequency.

In the present embodiment, the ultrasonic amplitude modulation circuit 26 modifies the change in signal voltage of the frequency for the proximity notification sound and/or the second whistle sound into the width of the quantity of the voltage as shown by (c) in FIG. 6. It is noted that, dissimilarly to the case (c) in FIG. 6, the change in signal voltage of the frequency for the proximity notification sound and/or the second whistle sound may be modified into the width of an occurrence time period of a voltage by using a PWM modulation.

(Description of Ultrasonic Wave Amplification Circuit 27)

The ultrasonic wave amplification circuit 27 is configured to drive the piezoelectric speakers 21 according to the ultrasonic wave signal obtained by implementing amplitude modulation of the frequency signal for the proximity notification sound and/or the second whistle sound. That is, the ultrasonic wave amplification circuit 27 is configured to drive the piezoelectric speakers 21 according to the output signal of the ultrasonic amplitude modulation circuit 26. The ultrasonic wave amplification circuit 27 is configured to control the applied voltage (charge-and-discharge state) of the piezoelectric speakers 21 thereby to cause the piezoelectric speakers 21 to generate an ultrasonic wave obtained by the amplitude modulation of the frequency signal for the proximity notification sound and/or the second whistle sound. Specifically, the ultrasonic wave amplification circuit 27 is, for example, an electric charge switching circuit (or a charge-and-discharge circuit for a piezo-electric element) configured to switch a voltage signal between a positive voltage and a negative voltage and to apply the switched positive and negative voltage signal to the piezoelectric speakers 21. In a case where the ultrasonic amplitude modulation circuit 26 sends the waveform signal shown by (c) in FIG. 6 to the ultrasonic wave amplification circuit 27, the ultrasonic wave amplification circuit 27 applies the waveform voltage shown by (c) in FIG. 6 to the ultrasonic speaker 7. Thereby, the ultrasonic wave amplification circuit 27 causes each of the piezoelectric speakers 21 to generate the ultrasonic wave in the shape of the output waveform shown by (c) in FIG. 6.

(Description of Horn Buzzer Drive Circuit 28)

The horn buzzer drive circuit 28 is a power amplifier (electricity amplification circuit) configured to cause the electromagnetic whistle device 1 to function as a dynamic speaker. More specifically, the horn buzzer drive circuit 28 is configured to amplify the increase and decrease in voltage of the frequency signal for the proximity notification sound outputted from the annunciation signal generation circuit 25. The horn buzzer drive circuit 28 is further configured to apply the amplified voltage signal on the electricity supply terminals connected to the both ends of coil 2 of the electromagnetic whistle device 1. The maximum output voltage of the horn buzzer drive circuit 28 is limited to be less than 8 volt (separately-excited voltage). In the present configuration, the horn buzzer drive circuit 28 does not cause the electromagnetic whistle device 1 to generate the whistle sound when outputting the voltage signal for generating the proximity notification sound.

(Description of Signal Processing Circuit 29)

The signal processing circuit 29 is, for example, configured to generate the proximity notification sound when receiving a notification sound activation signal from an engine control unit 30 (ECU) equipped in the vehicle S. More specifically, for example, the ECU 30 is configured to generate the notification sound activation signal by:

(i) sending the notification sound activation signal to the signal processing circuit 29 when the vehicle S is in a predetermined operation state requiring generation of the proximity notification sound, in a condition where, for example, the vehicle is running at a speed less than or equal to 20 km/h; or (ii) by sending the notification sound activation signal to the signal processing circuit 29 when a pedestrian recognition system (not shown) recognizes existence of a pedestrian in the traveling direction of the vehicle S, in a condition where the vehicle S is running.

The signal processing circuit 29 is configured to, on receiving the notification sound activation signal from the ECU 30:

(i) activate the parametric speaker to cause the ultrasonic speaker 7 to radiate the proximity notification sound; and (ii) activate the electromagnetic whistle device 1 as a dynamic speaker to cause the electromagnetic whistle device 1 to radiate the proximity notification sound.

The signal processing circuit 29 is further configured to, when the horn buzzer switch device 6 is manipulated by an occupant to cause the electromagnetic whistle device 1 to generate the first whistle sound:

(iii) activate the parametric speaker to cause the ultrasonic speaker 7 to radiate the second whistle sound.

(Operation of Vehicle Proximity Notification Device)

When the signal processing circuit 29 receives the notification sound activation signal from, for example, the ECU 30, the signal processing circuit 29 implements the control to cause the ultrasonic speaker 7 to radiate the ultrasonic wave shown by (c) in FIG. 6C. The ultrasonic wave is an inaudible sound wave generated by implementing the amplitude modulation of the signal waveform of the proximity notification sound. As the radiated ultrasonic wave propagates through the air, as shown by (d) in FIG. 6, a short wavelength component of the radiated ultrasonic wave is deformed and dampened due to viscosity of the air, and the like. Consequently, as shown by (e) in FIG. 6, an amplitude component included in the ultrasonic wave is self-demodulated through the air in the course of propagation. Consequently, the proximity notification sound occurs at a place distant from the vehicle S equipped with the ultrasonic speaker 7 being the source of the ultrasonic wave.

When the signal processing circuit 29 receives the notification sound activation signal from the ECU 30 and/or the like, the signal processing circuit 29 implements the control to cause the horn buzzer drive circuit 28 to send the electric signal to the electromagnetic whistle device 1 for generating the proximity notification sound by applying the separately-excited voltage. In the electromagnetic whistle device 1, the traveling contact 14 is in contact with the stationary contact 13 to supply electricity to the coil 2, when being applied with a voltage less than the separately-excited voltage. When the electric signal for the proximity notification sound is applied to the coil 2 of the electromagnetic whistle device 1, the coil 2 causes a magnetism change according to the electric signal for the proximity notification sound. Thus, the diaphragm 5 and the moving iron core 4 oscillate according to the electric signal for the proximity notification sound. Thus, the electromagnetic whistle device 1 can be used as a dynamic speaker in this way to generate the proximity notification sound.

(Operation of Whistle Device)

When the horn buzzer switch device 6 is manipulated and activated (ON) by an occupant:

(i) the battery voltage (self-excited voltage) is applied to the electromagnetic whistle device 1 to cause the electromagnetic whistle device 1 to generate the first whistle sound; and (ii) the activation signal (ON signal) of the horn buzzer switch device 6 is also sent to the signal processing circuit 29 to cause the ultrasonic speaker 7 to radiate the ultrasonic wave shown by (c) in FIG. 6C. The ultrasonic wave is an inaudible sound wave generated by implementing the amplitude modulation of the signal waveform of the second whistle sound.

As the ultrasonic wave radiated from the ultrasonic speaker 7 propagates through the air, as shown by (d) in FIG. 6, the radiated ultrasonic wave with a short wavelength is deformed (distorted) and dampened (attenuated) due to viscosity of the air, and the like. Consequently, as shown by (e) in FIG. 6, an amplitude component included in the ultrasonic wave is self-demodulated through the air in the course of propagation. Consequently, the second whistle sound occurs at a place distant from the vehicle S equipped with the ultrasonic speaker 7 being the source of the ultrasonic wave.

(Effect 1 of Embodiment)

(a) In a short distance range, such as 0 meter to 5 meter ahead of the vehicle, the proximity notification sound caused by the parametric speaker and the proximity notification sound caused by the electromagnetic whistle device 1 (dynamic speaker) are combined together to enable generation of a proximity notification sound with a large sound pressure. In this way, the proximity notification sound with a large sound pressure can be sent to a pedestrian in a short distance range between the vehicle S and a pedestrian. Thus, the pedestrian can be steadily notified of existence of the vehicle S.

(b) In a long distance range, such as 5 meter to 10 meter ahead of the vehicle, the proximity notification sound caused by the parametric speaker can be emitted. In this way, the proximity notification sound can be sent to a pedestrian even when the vehicle S is distant from the pedestrian. Thus, the pedestrian distant from the vehicle S can be steadily notified of existence of the vehicle S.

(c) The parametric speaker causes the ultrasonic wave to be self-modulated through the air and converted into an audible sound at a place distant from the vehicle S. Therefore, the proximity notification sound generated by the parametric speaker is hardly audible for an occupant such as a driver of the vehicle. In the present configuration, the proximity notification sound generated by the parametric speaker and the proximity notification sound generated by the electromagnetic whistle device 1 (dynamic speaker) are combined together (merged together) in the short-distance range to enable generation of the proximity notification sound with a large sound pressure. To the contrary, the proximity notification sound generated by the parametric speaker cannot be heard easily by an occupant in the vehicle S. Therefore, the sound pressure of the proximity notification sound being audible for a vehicle occupant can be suppressed.

(Effect 2 of Embodiment)

In the short distance range of the vehicle S, the proximity notification sound generated by the parametric speaker and the proximity notification sound generated by the electromagnetic whistle device 1 (dynamic speaker) are combined. Thus, the electromagnetic whistle device 1 (dynamic speaker) enables compensation of lack of low-pitched sound (low-frequency sound) of the parametric speaker. In this way, the sound pressure in the low-pitched sound range (low-frequency range) of the proximity notification sound can be enhanced.

Figure 7:
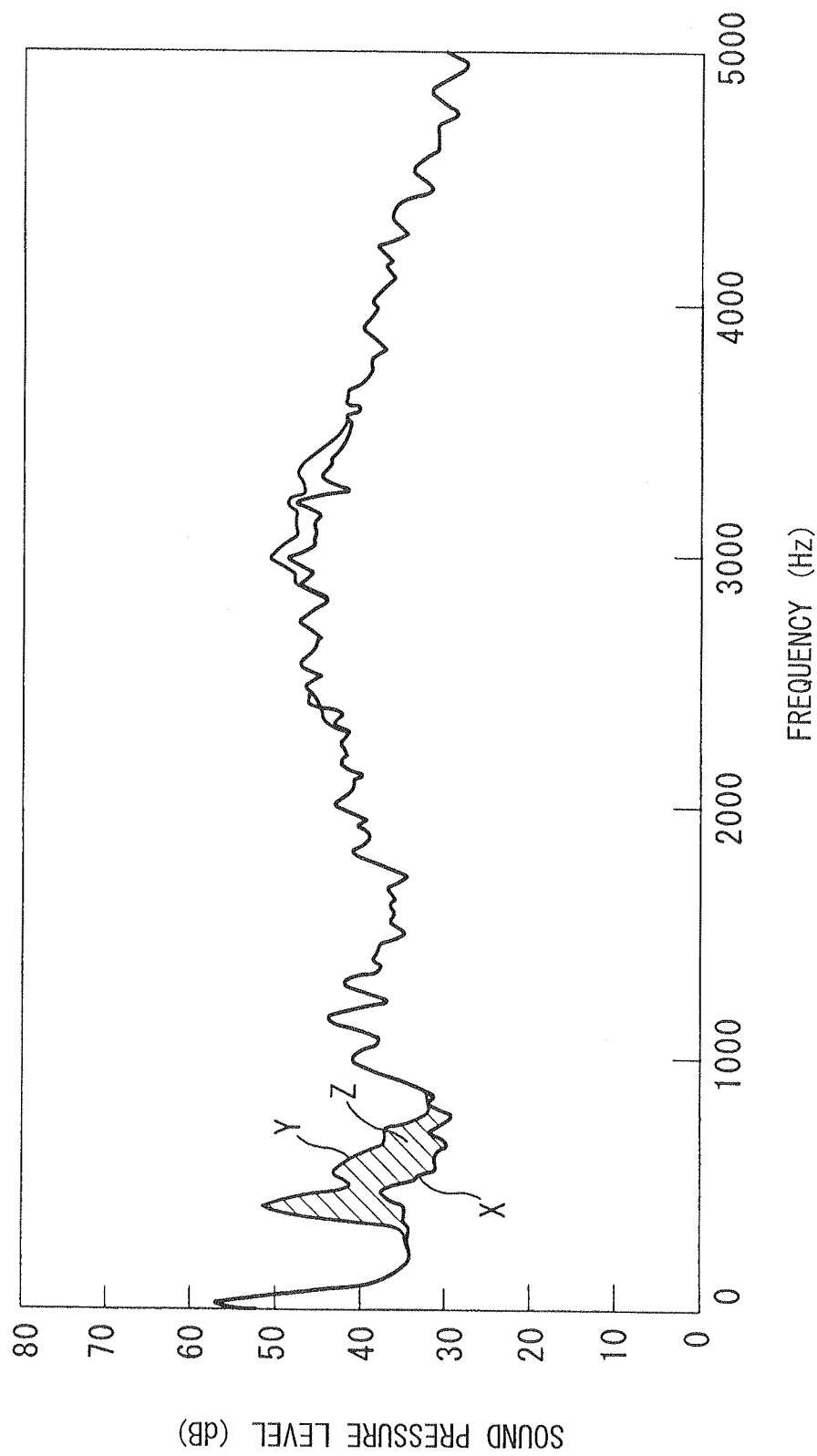
FIG. 7 is a graph showing both a frequency characteristic of a proximity notification sound caused by using only the parametric speaker and a frequency characteristic of a proximity notification sound caused by using both the parametric speaker and the electromagnetic whistle device.

More specifically:

(i) the solid line X in FIG. 7 indicates the frequency characteristic of the proximity notification sound generated by using only the parametric speaker; and (i) the solid line Y in FIG. 7 indicates the frequency characteristic of the proximity notification sound generated by using both the parametric speaker and the electromagnetic whistle device 1 (dynamic speaker). As indicated by the hatched area Z in the FIG. 7, the shortage of the low-pitched sound generated by the parametric speaker can be compensated by using the electromagnetic whistle device 1 (dynamic speaker). Thus, the sound pressure in the low-pitched sound region of the proximity notification sound can be enhanced.

(Effect 3 of Embodiment)

As shown in FIG. 5B, the proximity notification sound generated by the electromagnetic whistle device 1 (dynamic speaker) not having a directivity is radiated to all the circumferences of the vehicle S. In this way, the proximity notification sound can be generated in the region within a constant radius including the rear side of the vehicle S. In this way, the electromagnetic whistle device 1 (dynamic speaker) can radiate the proximity notification sound even in the range where the parametric speaker cannot radiate the proximity notification sound. Therefore, existence of the vehicle S can be notified to a pedestrian in a wide area.

(Effect 4 of Embodiment)

According to the embodiment, when the horn buzzer switch device 6 is manipulated:

the one electromagnetic whistle device 1 is caused to generate the first whistle sound; and the parametric speaker of the vehicle proximity notification device is caused to generate the second whistle sound.

In the present configuration, the number of the electromagnetic whistle devices 1 is reduced to one, and the whistle sound in two different tones can be caused simultaneously. The electromagnetic whistle devices 1 according to the present configuration is a double-horn-type device configured to simultaneously generate the whistle sound in two different tones. Even in such a configuration, the number of electromagnetic whistle devices 1 can be reduced to one. In addition, mountability of the electromagnetic whistle device 1 to the vehicle S can be improved.

(Effect 5 of Embodiment)

According to the present embodiment, the ultrasonic speaker 7 is provided in the lateral side of the acoustic tube 15 of the one electromagnetic whistle device 1. Therefore, the ultrasonic speaker 7 of the vehicular proximity notification device can be equipped to the vehicle S, by only mounting the one electromagnetic whistle device 1 to the vehicle S. Therefore, the ultrasonic speaker 7 of the vehicular proximity notification device can be equipped to the vehicle S, and the double-horn-type device can be produced, by only mounting the one electromagnetic whistle device 1 to the vehicle S.

Further, the control circuit part 20 is accommodated inside the electromagnetic whistle device 1. Therefore, by only equipping the one electromagnetic whistle device to the vehicle S, the vehicle proximity notification device can be also equipped to the vehicle S. Therefore, mountability of the vehicle proximity notification device to the vehicle can be enhanced.

(Effect 6 of Embodiment)

According to the present embodiment, the first whistle sound including the fundamental tone at 500 Hz and the second whistle sound including the fundamental tone at 400 Hz are combined to produce the chord sound. In this way, the tone quality of the whistle sound can be improved. In addition, discomfort caused by the whistle sound with respect to a pedestrian and an occupant can be reduced.

(Effect 7 of Embodiment)

According to the present embodiment, the second frequency of the fundamental tone of the second whistle sound generated by the ultrasonic speaker 7 is lower than the first frequency of the fundamental tone of the first whistle sound generated by the electromagnetic whistle device 1. In the present configuration, the electromagnetic whistle device 1 takes charge of the high-frequency side, and the parametric speaker of the vehicle proximity notification device takes charge of the low-frequency side. The electromagnetic whistle device 1 takes charge of the high-frequency side in this way, and therefore, the electromagnetic whistle device 1 can be downsized. Thus, manufacturing cost of the electromagnetic whistle device 1 can be reduced, and mountability for the electromagnetic whistle device 1 can be improved.

(Industrial Applicability)

In the above embodiment, the electromagnetic whistle device 1 includes the acoustic tube 15 (horn member, trumpet member). It is noted that, the electromagnetic whistle device 1 may not include the acoustic tube 15. In this case, for example, the diaphragm 5 may be oscillated to generate the whistle sound thereby to resonate a resonance plate (disk). Thus, the whistle sound may be amplified by the resonance sound and may be emitted to the outside of the vehicle. In the case where the electromagnetic whistle device 1 does not include the acoustic tube 15, the ultrasonic speaker 7 may be attached directly to the electromagnetic whistle device 1 by using a bracket and/or the like. In the present configuration, the ultrasonic speaker 7 can be attached to the vehicle S by mounting the electromagnetic whistle device 1 to the vehicle S.

Summarizing the above embodiment, when the horn buzzer switch device is manipulated, the vehicular annunciation device may be configured to:
  generate the first whistle sound (first alarm sound) with the one electromagnetic whistle device (vehicular horn buzzer) being a single component; and
  generate the second whistle sound (second alarm sound) with the ultrasonic speaker (ultrasonic speaker in a parametric speaker) of the vehicle proximity notification device.

The electromagnetic whistle device according to the present configuration is configured to generate the whistle sound including two different tones simultaneously. Even in such a configuration, the number of electromagnetic whistle devices can be reduced to one. In addition, mountability of the electromagnetic whistle device to the vehicle can be improved.

The vehicular annunciation device may generate a chord sound with the first frequency and the second frequency. In the present configuration, the first whistle sound and the second whistle sound are combined together to generate the chord sound. Therefore, the quality of the whistle sound can be enhanced, and discomfort of the whistle sound can be reduced.

In the vehicular annunciation device, the second frequency of the fundamental tone of the second whistle sound generated by the ultrasonic speaker is set to be lower than the first frequency of the fundamental tone of the first whistle sound generated by the electromagnetic whistle device. In the present configuration, the electromagnetic whistle device takes charge of the high-frequency sound side (high-pitched sound side). Accordingly, the electromagnetic whistle device can be downsized, and mountability of the electromagnetic whistle device can be enhanced. An electric signal for the proximity notification sound at a separately-excited voltage, which is lower than the self-excited voltage, may be sent to the electromagnetic whistle device, when the vehicle proximity notification device causes the parametric speaker to emit the proximity notification sound. In this case, the electromagnetic whistle device is also caused to emit the proximity notification sound in this way. In the present configuration, the electromagnetic whistle device is used as a dynamic speaker. Thus, the dynamic speaker is also caused to generate the proximity notification sound simultaneously with the parametric speaker.

The parametric speaker is combined with the electromagnetic whistle device utilized as the dynamic speaker to generate the proximity notification sound in this way. Thereby, the shortage of the low-pitched sound (low-frequency sound) in the range near the vehicle can be compensated with the proximity notification sound caused by the electromagnetic whistle device utilized as the dynamic speaker. Thus, the problem of the parametric speaker can be solved.

In addition, the proximity notification sound caused by the electromagnetic whistle device utilized as the dynamic speaker has a wide directivity, dissimilarly to the parametric speaker. Accordingly, the proximity notification sound, which is caused by the electromagnetic whistle device utilized as the dynamic speaker, occurs in the area around vehicle including the rear side of the vehicle. The parametric speaker is combined with the electromagnetic whistle device utilized as the dynamic speaker to generate the proximity notification sound in this way. Thereby, the narrow directivity of the parametric speaker can be compensated with the electromagnetic whistle device utilized as the dynamic speaker. Thus, the problem of the parametric speaker can be solved.

The above processings such as calculations and determinations are not limited to be executed by the ECU 30, the signal processing circuit 29, and the like.

The control unit may have various structures including at least a part of the ECU 30, the signal processing circuit 29, and the like shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

The above embodiments are not limited to an analog circuitry including analog signal handling equipments configured to perform the processings such as the comparison, the amplification, and other operations by using analog quantities.

For example, at least part of the signals in the circuit structures in the above embodiments may be converted to digital signals, and substantially the same processings such as the comparison, the amplification, and other operations may be performed using the converted digital signals by employing a microcomputer, a programmable logic circuit, and the like.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicular annunciation device comprising:
    an electromagnetic alarm device being a single element, the electromagnetic alarm device including:
        a coil configured to generate a magnetism when supplied with an electricity;
        a current interrupter configured to interrupt an electricity supply circuit of the coil when the coil receives a direct current at a self-excited voltage greater than or equal to a threshold;
        a moving iron core configured to be driven by the magnetism generated by the coil; and
        a diaphragm joined with the moving iron core, wherein the current interrupter is configured to intermit the electricity supplied to the coil to oscillate the diaphragm with the moving iron core to generate a first alarm sound including a fundamental tone at a first predetermined frequency, when an alarm switch device is manipulated by an occupant to apply the self-excited voltage on the coil; and
    a vehicle proximity notification device including a parametric speaker configured to cause an ultrasonic speaker to emit a notification ultrasonic wave to an outside of the vehicle for notifying a pedestrian of proximity of the vehicle, according to a traveling state of the vehicle and/or when a sensor detects a pedestrian, the notification ultrasonic wave being generated by implementing ultrasonic modulation on a proximity notification sound, which is different from an alarm sound, wherein
    the vehicle proximity notification device is configured to cause the ultrasonic speaker to emit an alarm ultrasonic wave when the alarm switch device is manipulated, the alarm ultrasonic wave being generated by implementing ultrasonic modulation on a second alarm sound including a fundamental tone at a second frequency, which is different from the first frequency.

2. The vehicular annunciation device according to claim 1, wherein the first frequency and the second frequency generate a chord sound.

3. The vehicular annunciation device according to claim 1, wherein
    the fundamental tone of the first alarm sound caused by the electromagnetic alarm device is at the first frequency,
    the fundamental tone of the second alarm sound caused by the ultrasonic speaker is at the second frequency, and
    the second frequency is lower than the first frequency.

4. The vehicular annunciation device according to claim 1, wherein
    the vehicle proximity notification device is further configured to send an electric signal at a separately-excited voltage, which is lower than the self-excited voltage and for generating a proximity notification sound, to the electromagnetic alarm device to cause the electromagnetic alarm device to further generate the proximity notification sound, when causing the parametric speaker to generate the proximity notification sound.

5. The vehicular annunciation device according to claim 1, further comprising:
    a modulator configured to implement the ultrasonic modulation on the proximity notification sound to generate the notification ultrasonic wave and to implement the ultrasonic modulation on the second alarm sound to generate the alarm ultrasonic wave.

6. The vehicular annunciation device according to claim 1, further comprising:
    the alarm switch device configured to be manipulated by an occupant of the vehicle.

7. The vehicular annunciation device according to claim 1, further comprising:
    a unit for detecting a traveling state of the vehicle; and
    a sensor configured to detect a pedestrian around the vehicle.

8. A method for notifying proximity of a vehicle, the method comprising:
    implementing ultrasonic modulation on a proximity notification sound, which is different from an alarm sound, to generate a notification ultrasonic wave and causing an ultrasonic speaker to emit the notification ultrasonic wave to an outside of the vehicle for notifying a pedestrian of proximity of the vehicle, according to a traveling state of the vehicle and/or on detection of a pedestrian;
    causing a current interrupter to intermittently send a direct current at a self-excited voltage, which is greater than or equal to a threshold, to a coil to manipulate a magnetism generated by the coil for driving a moving iron core thereby to oscillate a diaphragm to generate a first alarm sound including a first fundamental tone at a first predetermined frequency, when an alarm switch device is manipulated by an occupant; and
    implementing ultrasonic modulation on a second alarm sound including a second fundamental tone at a second frequency, which is different from the first frequency, to generate an alarm ultrasonic wave and causing the ultrasonic speaker to emit the alarm ultrasonic wave, when the alarm switch device is manipulated.

9. The method according to claim 8, further comprising:
    detecting the traveling state of the vehicle; and
    detecting a pedestrian around the vehicle.

10. The method according to claim 8, wherein the first frequency and the second frequency generate a chord sound.

11. The method according to claim 8, wherein the second frequency is lower than the first frequency.

12. The method according to claim 8, further comprising:
    sending an electric signal at a separately-excited voltage, which is lower than the self-excited voltage, to the coil to further generate a proximity notification sound, when causing the parametric speaker to emit the notification ultrasonic wave.

13. A computer-readable storage medium encoded with instructions for causing a processor to execute the method according to claim 8.

* * * * *